(12) United States Patent
Hsieh

(10) Patent No.: US 7,431,496 B2
(45) Date of Patent: Oct. 7, 2008

(54) STRUCTURE OF AN ELECTRONIC THERMOMETER

(75) Inventor: Chih-Wei Hsieh, Hsinchu Hsien (TW)

(73) Assignee: Actherm Inc., Hsinchu Hsien (TW)

( * ) Notice: Subject to any disclaimer, the term of this patent is extended or adjusted under 35 U.S.C. 154(b) by 110 days.

(21) Appl. No.: 11/466,771

(22) Filed: Aug. 24, 2006

(65) Prior Publication Data

US 2007/0223562 A1    Sep. 27, 2007

(30) Foreign Application Priority Data

Mar. 23, 2006    (TW) .............................. 95110149 A

(51) Int. Cl.
*G01K 1/00*    (2006.01)
*G01K 7/00*    (2006.01)

(52) U.S. Cl. ............... 374/208; 374/163; 374/E13.002

(58) Field of Classification Search ................ 374/208, 374/163; 200/549, 530, 531; 600/549, 530, 600/531

See application file for complete search history.

(56) References Cited

U.S. PATENT DOCUMENTS

| 4,152,564 A * | 5/1979 | Wirz ........................... 200/530 |
| 5,178,467 A * | 1/1993 | Chen ........................... 374/151 |
| 6,394,648 B1 * | 5/2002 | Tseng .......................... 374/208 |
| 6,851,850 B1 * | 2/2005 | Lee ............................. 374/208 |
| 6,930,264 B2 * | 8/2005 | Nagai et al. .................. 200/252 |
| 6,939,039 B2 * | 9/2005 | Brunvoll ...................... 374/208 |
| 2004/0114668 A1 * | 6/2004 | Hsieh .......................... 374/208 |
| 2005/0094707 A1 * | 5/2005 | Lee et al. ..................... 374/163 |
| 2006/0062276 A1 * | 3/2006 | Conforti ....................... 374/163 |

FOREIGN PATENT DOCUMENTS

| JP | 61017034 A | * | 1/1986 |
| JP | 61124832 A | * | 6/1986 |
| JP | 62162933 A | * | 7/1987 |

* cited by examiner

*Primary Examiner*—Edward Lefkowitz
*Assistant Examiner*—Mirellys Jagan
(74) *Attorney, Agent, or Firm*—Leong C. Lei

(57) ABSTRACT

A structure of an electronic thermometer which mainly includes a body portion, a temperature sensing head and a core. The core includes a temperature display screen, a printed circuit board provided with an electrical contact, and a conductor fixing rod arranged adjacent to the core. The conductor fixing rod is a flexible member on which is mounted a conductor against the electrical contact. The conductor fixing rod has an end fixed mounted on the core and another end of the conductor is free. A pushbutton switch is mounted on a rear end of the body portion. The pushbutton switch is arranged against a longitudinal end of the conductor fixing rod and can get in touch with and can be depressed to exert force on the conductor fixing rod in a direction along a length of the body portion or in an acute angle with respect to the length of the body portion.

4 Claims, 6 Drawing Sheets

STRUCTURE OF AN ELECTRONIC THERMOMETER

BACKGROUND OF THE INVENTION

1. Field of the Invention

This invention is related to a structure of an electronic thermometer, and in particular to one which overcomes the insufficiency of the prior art and enables the pushbutton switch to be operated longitudinally thereby making it easier to be used in the mouth or similar situation and therefore meeting the needs in certain special occasions. Furthermore, the structure of the electronic thermometer is easy to manufacture, low in cost and reliable in use.

2. Description of the Prior Art

The conventional mercury-in-glass thermometer is a thermometer consisting of mercury in a glass tube. Calibrated marks on the tube allow the temperature to be read by the length of the mercury within the tube, which varies according to the temperature—adoption of the characteristics of the mercury, where the mercury volume will expand when hot and contract when cold. As the conventional mercury-in-glass thermometer is made by glasses, cautions shall be taken when use to avoid breaking it, especially when applied to mouth or anus, where the leakage of the mercury is harmful for human body. Furthermore, for those patients required constant body temperature monitored, the conventional mercury-in-glass thermometer lacks the comforts and conveniences of taking one's temperature at anytime. Thus, an improved thermometer shall be investigated to combat the inefficiencies of the conventional mercury-in-glass thermometer.

Electronic thermometers have been developed recently to take one's temperature; however, they come with little waterproofing capability. The horizontal design of the switch button for the electronic thermometer made it inconvenient under certain specific environments and when applied to mouth. Japanese Patent Application Publication No. 61-191928 discloses a structure of switch button for electronic thermometers, comprising a sealed member inside the cover located at the end of the electronic thermometer, a flexible piece made of soft resin compound is liquid sealed at the top of the sealed member, an adjustable switch button is equipped at the top of the flexible piece and the press button is located in the switch hole at the middle of the said cover, with the top bulged out of the switch hole and a base connecting the flexible chip, and an "O" shaped circular seal between the surface of the press button and the switch hole. An of/off switch device is provided at the bottom of the flexible piece and includes a plastic base, and a switching spring plate fixedly mounted on the top of the plastic base. The top of the switching spring plate is always in contact with the bottom surface of the flexible piece. Further, the plastic base is provided with a contact plate corresponding to the switching spring plate, and the switching spring plate and the contact plate are respectively connected to the anode and cathode of the electrical circuit. When the switch button is under external force, the switch button moves down, providing downward pressure on the flexible piece to deform it flexibly. The flexible piece in turn forces the switching spring plate to deform until the end of the switching spring plate touches the corresponding contact plate to switch on the electrical circuit, and starts the electronic thermometer.

Although the above-mentioned structure allows switch button at the bottom of the electronic thermometer to be manipulated vertically, the adoption of metal spring plate with the on/off switch device comes with the following disadvantages: 1) as the on/off device comprises of a plastic base and metal spring plate, it cannot be manufactured in one time; further processes to bend the spring plate and to adhere the plastic base are also required. This complex structure and assembly provide higher chances of producing defective products; 2) there's quite a large discrepancy in the structure of the presently used electric thermometers, which associates with higher improvement costs and less business satisfactory; 3) the spring plate may become inelastic after numerous bending deformations to result in the failure of the switch button, thus providing less reliability. In conclusion, there are still insufficiencies for the current skill of art, and room awaits further improvements.

SUMMARY OF THE INVENTION

The primary object of the present invention is to provide a structure of an electronic thermometer which can meet the needs in certain special occasions and is simple thereby facilitating manufacturing process and reducing manufacturing cost and which is reliable in use. The structure of the electronic thermometer includes a body portion in which is mounted a core, said core including a temperature display screen, a printed circuit board provided with an electrical contact, and a conductor fixing rod arranged adjacent to said core, said conductor fixing rod being a flexible member on which is mounted a conductor against said electrical contact, a temperature sensing head positioned at a front end of said body portion, wherein said conductor fixing rod has an end fixed mounted on said core, another end of said conductor is free, an on/off switch is mounted on a rear end of said body portion, said on/off switch is arranged against a longitudinal end of said conductor fixing rod and can get in touch with and can be depressed to exert force on said conductor fixing rod in a direction along a length of said body portion or in an acute angle with respect to said length of said body portion.

The adjacent ends of said pushbutton switch and said conductor fixing rod are provided with slanted surfaces or curved surfaces, and said adjacent ends provide planar contact when getting in touch with each other. Further, only one of the adjacent ends of said pushbutton switch and said conductor fixing rod is provided with a slanted surface or curved surface, so that said adjacent ends provide line or point contact when getting in touch with each other. As a consequence, the depressing force along the longitudinal axis will produce a transverse component force which will cause the flexible conductor fixing rod produce transverse deformation thereby making the conductor get in touch with the electrical contact on the printed circuit board.

The rear of the above-mentioned thermometer body portion is provided with a cap which is engageable with the intermediate section of the body portion and the pushbutton switch is mounted on the cap and arranged on the longitudinal axis of the cap or on a position which is biased from the longitudinal axis of the cap. The pushbutton switch is a flexible key.

The rear end and the intermediate section of the above-mentioned thermometer body portion may be integrally formed and the pushbutton switch is a rigid pushbutton which extends through a hole of a partition in the body portion to be located against the conductor fixing rod and to be able to get in touch with the conductor fixing rod. A spring or the like is fitted between the pushbutton and the partition.

The temperature sensing head can be formed integrally formed with the body portion and the temperature sensor is flexible in property, especially suitable for use with patients such as children, the aged and the weaked.

The present invention applies the means of enlarging the distance between the pushbutton switch and the measuring end so as to increase of the depth that the electronic thermometer can be immersed in a liquid without investing high cost to improve the waterproof capability of the pushbutton switch. Further, the pushbutton switch is changed so that the depression of the pushbutton switch is operated along the longitudinal axis of the body portion thereby making it easier to be used in the mouth or similar situation and therefore meeting the needs in certain special occasions. Moreover, the position of the pushbutton switch is moved to the end of the thermometer body portion so that the electronic thermometer has a more streamlined outlook and the design of the structure and the manufacturing process will be facilitated. Of more importance, the pushbutton switch directly forces the flexible member to bend and deform thereby making the conductor get in touch with the electrical contact on the printed circuit board without using a metal spring member that will easily lose its resiliency and therefore increasing reliability and prolonging the service life of the electronic thermometer. Secondly, it is unnecessary to make significant changes to the interior structure of the electronic thermometer in order to achieve the above-mentioned improvement in function thereby reducing the cost in production and meeting the needs of the manufacturer. Thirdly, the bending and adhesive technology can be eliminated and the structure and processing will become easier thus reducing manufacturing cost and enhancing the productivity.

DETAILED DESCRIPTION OF THE PREFERRED EMBODIMENT

Figure 1:
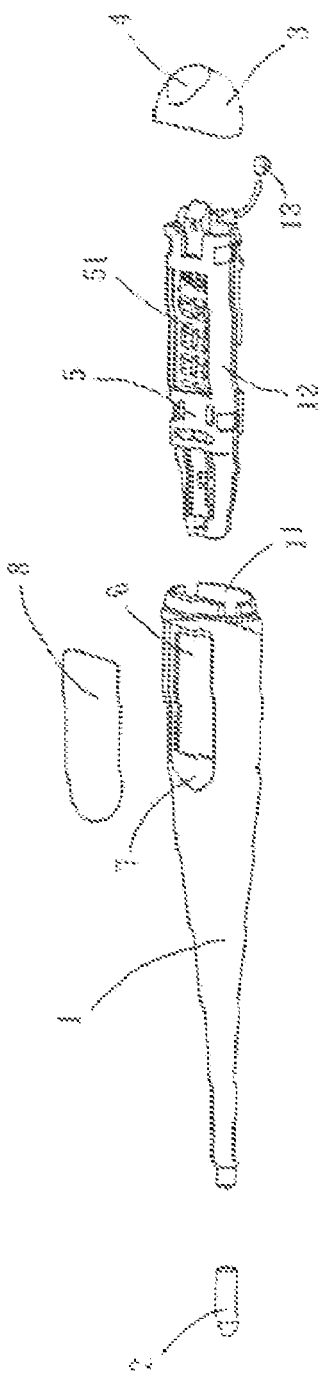
FIG. 1 is an exploded view of an electronic thermometer according to a preferred embodiment of the present invention.
Figure 2:
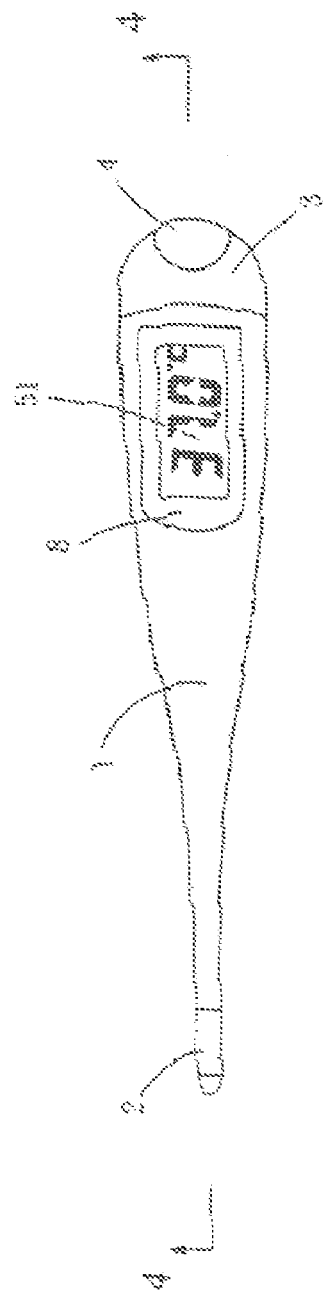
FIG. 2 is a front view of the present invention.
Figure 3:
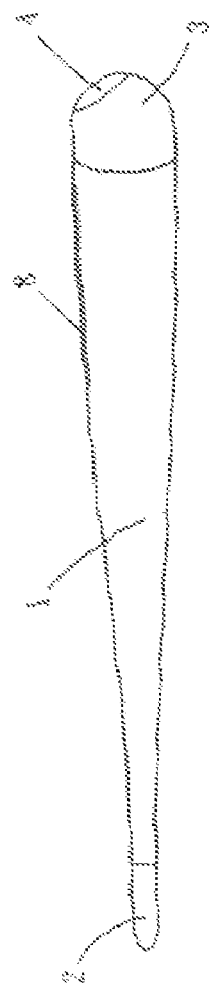
FIG. 3 is a side view of the present invention.
Figure 4:
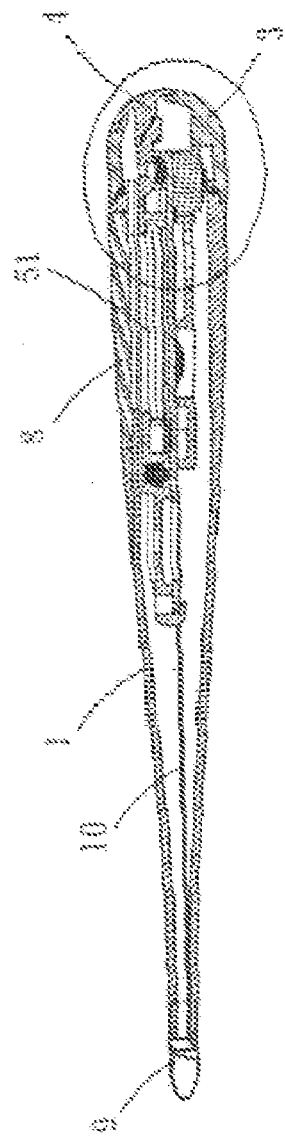
FIG. 4 is a sectional view along line 4-4 of FIG. 1.
Figure 5:
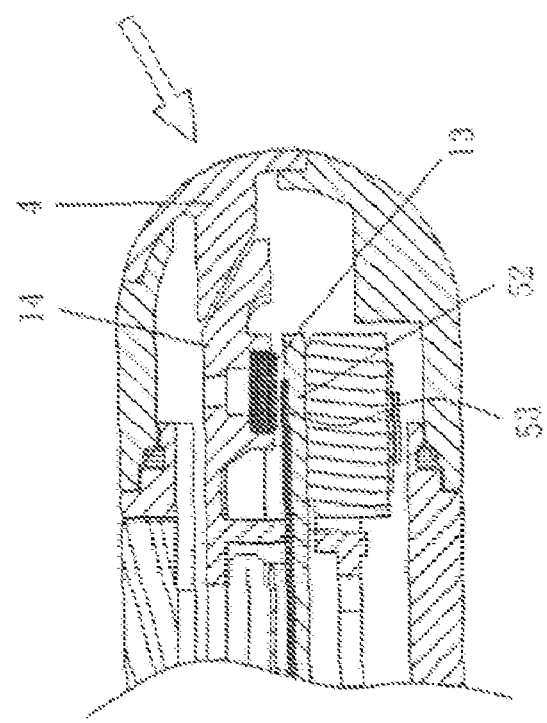
FIG. 5 is an enlarged view of a portion of FIG. 4.

Referring to FIGS. 1, 2, 3, 4 and 5, the electronic thermometer according to a first preferred embodiment according to the present invention comprises an elongated body portion 1 which is a hollow member integrally and preferably made of plastic. The front end of the body portion 1 is engaged with a temperature sensing head 2 which is preferably made of good conductive material (such as metal). The rear end of the body portion 1 is engaged with a detachable cap 3 on which is mounted a pushbutton switch 4. Within the body portion 1 there are a display screen 51 (preferably LCD display) for showing the temperature detected by the temperature sensing head 2, a printed circuit board 52 and a core 5 with an electrical contact 53. The body portion 1 is formed with a window 6 and an opening 11 which are configured for receiving the display screen 51 and the switch 4 respectively. The circumferential edge of the window 6 is formed with a recess 7 in which is fixedly mounted a transparent panel 8 by adhesive (or by ultrasonic welding) to close the window 6. Hence, the display screen 51 can be viewed through the transparent panel 8. Within the temperature sensing head 2 is mounted a temperature sensor 9 which is electrically connected to the printed circuit board 52 of the core 5 via a conductive wire 10.

The rear end of the body portion 1 has an opening 11 through which the core 5 is inserted into the body portion 1. The opening 11 is configured to engage with the cap 3. The core 5 is constituted by the core body 12, the display screen 51 fixedly mounted on the core body 12 for showing temperature reading, the printed circuit board 52, the conductor 13, and a conductor fixing rod 14. The conductor 13 is used for electrically connecting the printed circuit board 52 to a battery (not shown) so as to run the temperature measuring program. The conductor fixing rod 14 is a flexible member so that one may indirectly depress the conductor fixing rod 14 by depressing the pushbutton switch 4 on the cap 3. As the pushbutton switch 4 is depressed, the conductor fixing rod 14 will be deformed to move the conductor 13 against the printed circuit board 52 thereby getting in touch with the electrical contact 53 of the printed circuit board 52.

The pushbutton switch 4 on the cap 3 is made of flexible material and arranged beside a longitudinal end of the conductor fixing rod 14. The conductor fixing rod 14 is also made of flexible material. The conductor fixing rod 14 has a slanted end which is arranged against a slanted end of the pushbutton switch 4 and can get in touch with the slanted end of the pushbutton switch 4. Hence, when the pushbutton switch 4 is depressed, the slanted end of the conductor fixing rod 14 will be biased to go sideward thereby deforming the conductor fixing rod 14 and forcing the conductor fixing rod 14 to push the conductor 13 against the printed circuit board 52 thus making the conductor 13 get in touch with the electrical contact 53 on the printed circuit board 52.

Figure 6:
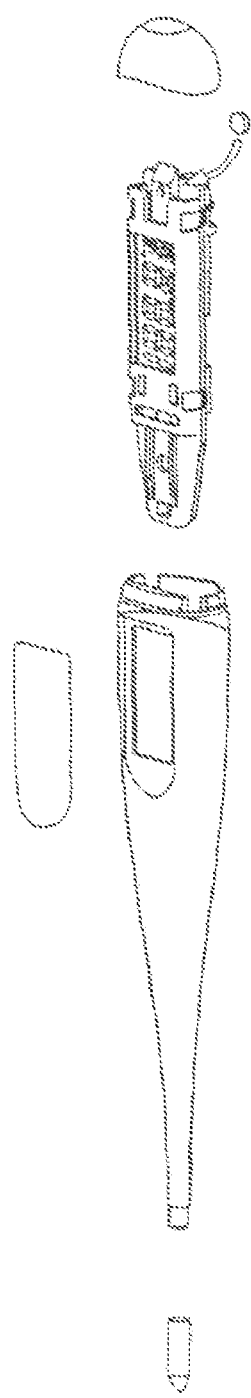
FIG. 6 is an exploded view of an electronic thermometer according to a second preferred embodiment of the present invention.
Figure 7:
FIG. 7 is a front view of the electronic thermometer according to the second preferred embodiment of the present invention.
Figure 8:
FIG. 8 is a side view of the electronic thermometer according to the second preferred embodiment of the present invention.
Figure 9:
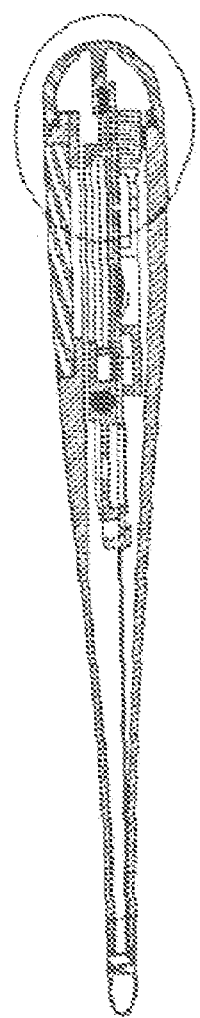
FIG. 9 is a sectional view along line 9-9 of FIG. 7.
Figure 10:
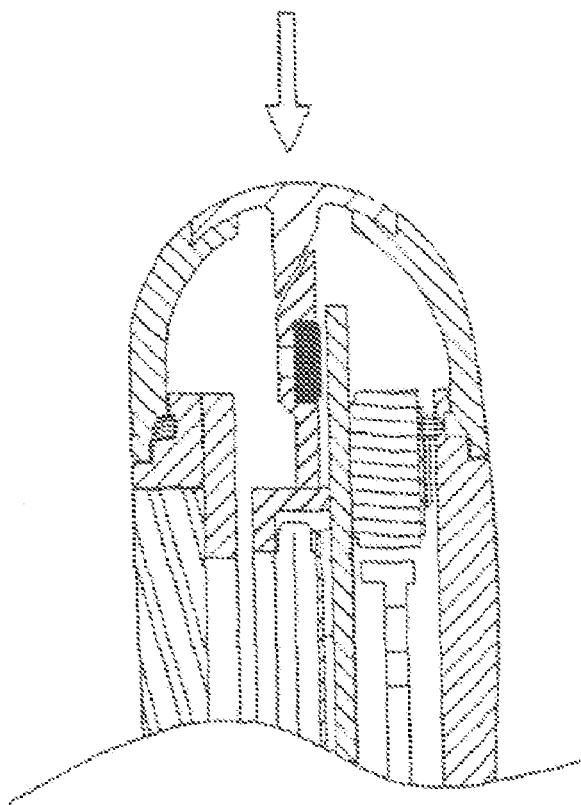
FIG. 10 is an enlarged view of a portion of FIG. 9.

FIGS. 6, 7, 8, 9 and 10 illustrates an electronic thermometer according to a second preferred embodiment of the present invention. The electronic thermometer according to the second preferred embodiment differs from the electronic thermometer according to the first preferred embodiment in that the pushbutton switch of the former is arranged right on the longitudinal axis of the body portion while the pushbutton switch of the latter is not. According to the second preferred embodiment, the conductor fixing rod is arranged close to the longitudinal axis of the body portion so as to be located against the pushbutton switch. Similarly, the conductor fixing rod has a slanted end which is arranged against a slanted end of the pushbutton switch and can get in touch with the slanted end of the pushbutton switch. The structure of the other portions and the working principle of the electronic thermometer according to the second preferred embodiment are similar to those of the electronic thermometer according to the first preferred embodiment, and there is no need to describe them herein again.

Figure 11:
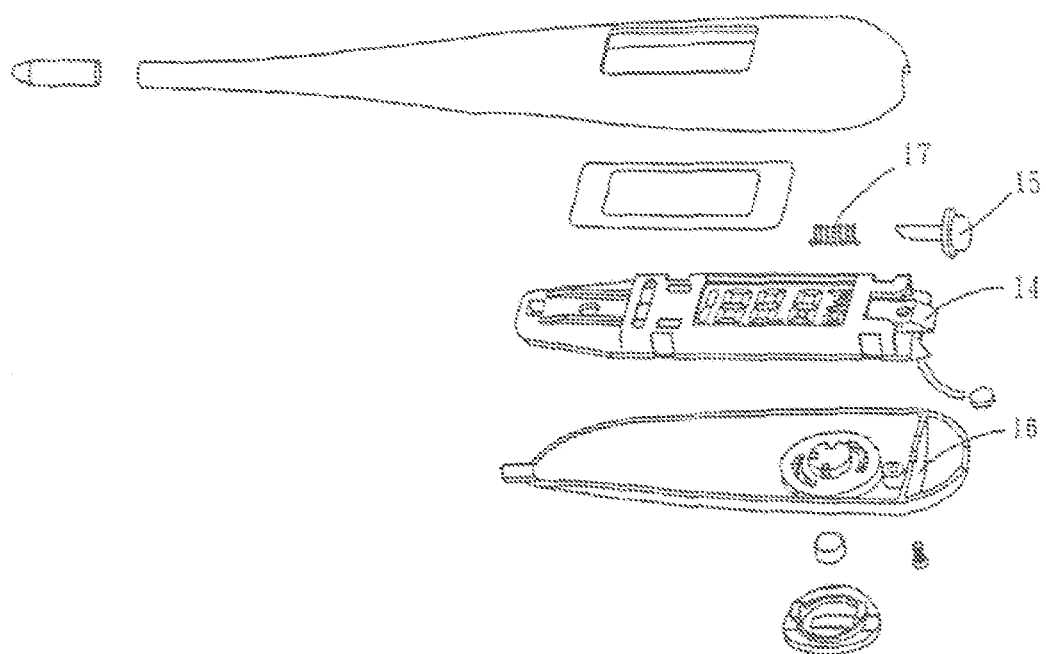
FIG. 11 is an exploded view of an electronic thermometer according to a third preferred embodiment of the present invention.
Figure 12:
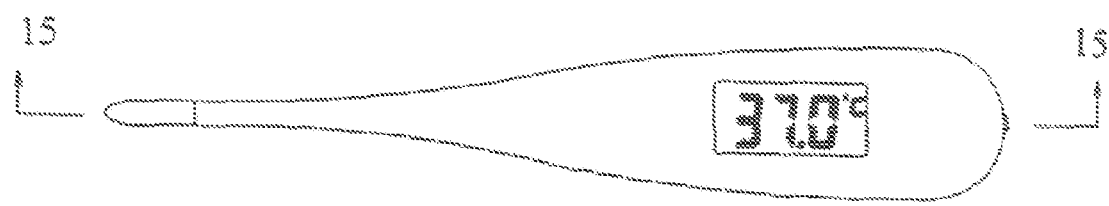
FIG. 12 is a front view of the electronic thermometer according to the third preferred embodiment of the present invention.
Figure 13:
FIG. 13 is a side view of the electronic thermometer according to the third preferred embodiment of the present invention.
Figure 14:
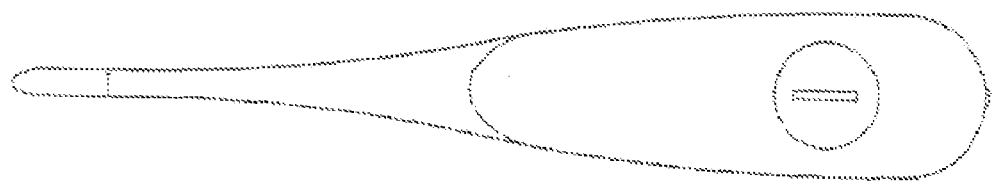
FIG. 14 is a rear view of the electronic thermometer according to the third preferred embodiment of the present invention.
Figure 15:
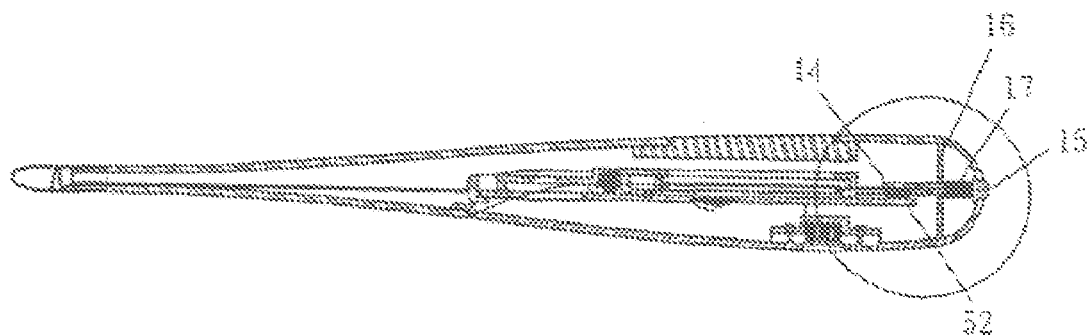
FIG. 15 is a sectional view along line 15-15 of FIG. 12.
Figure 16:
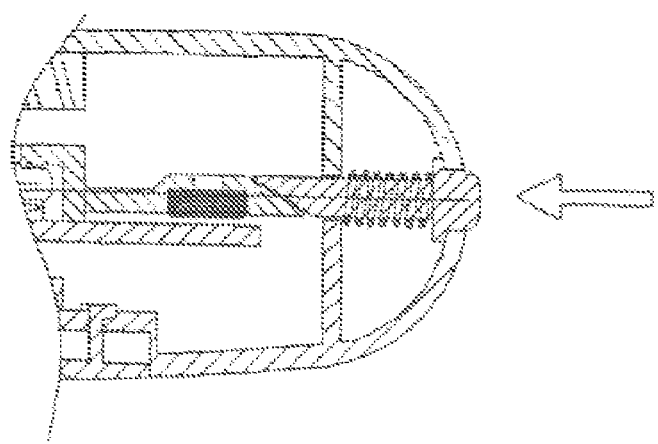
FIG. 16 is an enlarged view of a portion of FIG. 15.

FIGS. 11, 12, 13, 14, 15 and 16 illustrates an electronic thermometer according to a third preferred embodiment of the present invention. The cap and the body portion of the electronic thermometer are integrally formed, i.e. the cap and the body portion are not two detachable members. The end of the body portion is provided with a rigid pushbutton 15 which has a pin extending through a hole of a partition 16 in the body portion to be located against the conductor fixing rod 14 and to be able to get in touch with the conductor fixing rod 14. A spring 17 or the like is fitted between the pushbutton 15 and the partition 16 so that the pushbutton 15 will return to its original position when released.

According to the above-mentioned three preferred embodiments, the temperature sensing head can be formed integrally formed with a front end of the body portion so that no seam will be formed therebetween and the temperature sensor can be fitted in the temperature sensing head and directly joined to the body portion by means of plastic material. The temperature sensor is flexible in property, especially suitable for use with patients such as children, the aged and the weaked.

It will be understood that the present invention is not limited to the above-mentioned preferred embodiments and that all pushbutton switches mounted on the rear end of the electronic thermometer body and the depressing direction of the pushbutton switches is basically along the length of the thermometer body or forms an acute angle with the length of the thermometer body should lie within the protection scope of the present invention. The opposing ends of the pushbutton switch and the conductor, except that they are slanted, can be also curved in shape. Further, one of the opposing ends may be provided with a slanted surface or curved surface, while the other one of the opposing ends may be provided with a planar surface or a surface of other shapes which can get in a line touch with the slanted surface through an angular portion. Moreover, the one of the opposing ends may be provided with a slanted surface or curved surface, while the other one of the opposing ends is provided with a conical surface thereby providing a point contact between the opposing ends. The above-mentioned modifications can all achieve the purpose of bending the conductor fixing rod under the operation of the pushbutton switch thereby moving the conductor against the printed circuit board and getting in electrical touch with the electrical contact on the printed circuit board.

I claim:

1. A structure of an electronic thermometer comprising:
a hollow elongated body portion integrally made of plastic and having a first end and a second end, said hollow elongated body portion being formed with a window, said second end of said hollow elongated body portion having an opening, a circumferential edge of said window having a recess;
a transparent panel fixedly mounted in said recess to close said window;
a temperature sensing head engaged with said first end of said hollow elongated body portion and made of conductive material;
a detachable cap engaged with said opening of said hollow elongated body portion;
a pushbutton switch mounted on said detachable cap;
a temperature sensor mounted within said temperature sensing head;
a core inserted into said body portion, said core including a core body, a display screen, a printed circuit board, a conductor and a conductor fixing rod, said display screen being mounted in said window of said hollow elongated body portion for showing temperature reading, said printed circuit board being electrically connected to said temperature sensor via a conductive wire, said conductor fixing rod being a flexible member so that one can indirectly depress said conductor fixing rod by depressing said pushbutton on said detachable cap;
said pushbutton switch being made of flexible material and arranged beside an end of said conductor fixing rod, said conductor fixing rod being made of flexible material, said conductor fixing rod having a slanted end which is arranged against a slanted end of said pushbutton switch and can get in touch with said slanted end of said pushbutton switch;
whereby when said pushbutton switch is depressed, said slanted end of said conductor fixing rod will be biased to go sideward thereby deforming said conductor fixing rod and forcing said conductor fixing rod to push said conductor against said printed circuit board thus making said conductor get in touch with an electrical contact on said printed circuit board.

2. The structure of an electronic thermometer as claimed in claim 1, wherein said detachable cap being integrally formed with said hollow elongated body portion, and said pushbutton switch is a rigid member having a pin extending through a hole of a partition in said body portion to be located against said conductor fixing rod and to be able to get in touch with said conductor fixing rod, and a reset member is provided between said pin and said partition.

3. The structure of an electronic thermometer as claimed in claim 2, wherein a spring is fitted between said pushbutton and the partition for returning said pushbutton to an original position when said pushbutton is released.

4. The structure of an electronic thermometer as claimed in claim 2, wherein said temperature sensing head and said body portion are integrally formed and said temperature sensing head is made of flexible material.

* * * * *